US007222064B1

(12) United States Patent
Sollom et al.

(10) Patent No.: US 7,222,064 B1
(45) Date of Patent: May 22, 2007

(54) INSTRUCTION PROCESSOR EMULATION HAVING INTER-PROCESSOR MESSAGING ACCOUNTING

(75) Inventors: Jason D. Sollom, Champlin, MN (US); James A. Williams, Mahtomedi, MN (US); Christopher M. Cischke, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 649 days.

(21) Appl. No.: 10/683,029

(22) Filed: Oct. 10, 2003

(51) Int. Cl.
*G06F 9/455* (2006.01)
*G06F 9/00* (2006.01)

(52) U.S. Cl. .................. 703/26; 703/23; 703/27; 712/220; 712/233; 712/237

(58) Field of Classification Search .............. 703/23, 703/26, 27; 712/220, 233, 237
See application file for complete search history.

(56) References Cited

U.S. PATENT DOCUMENTS

| 5,889,978 | A * | 3/1999 | Jayakumar | 703/27 |
| 6,356,997 | B1 * | 3/2002 | Krishnan et al. | 712/237 |
| 6,370,606 | B1 * | 4/2002 | Bonola | 710/260 |
| 6,971,103 | B2 * | 11/2005 | Hokenek et al. | 718/107 |
| 7,065,614 | B1 * | 6/2006 | Vartti et al. | 711/141 |
| 7,096,322 | B1 * | 8/2006 | Sollom et al. | 711/143 |

OTHER PUBLICATIONS

Svenson, A. "Software Primitives for Emulation of Multi-Processor Architectures". Proc. of the 23rd Hawaii Int'l Conf. on System Science. vol. 1. pp. 48-56. Jan. 2-5, 1990.*
Blough, D.M. et al. "Fault-Injection-Based Testing of Fault-Tolerant Algorithms in Message-Passing Parallel Computers." 27th Int'l Symposium on Fault-Tolerant Computing. pp. 258-267. Jun. 24-27, 1997.*

* cited by examiner

*Primary Examiner*—Paul Rodriguez
*Assistant Examiner*—Ayal Sharon
(74) *Attorney, Agent, or Firm*—Beth L. McMahon; Charles A. Johnson; Shumaker & Sieffert, P.A.

(57) ABSTRACT

Techniques are described for emulating inter-processor communications between multiple instruction processors. The techniques provide inter-processor message accounting and error detection. A system, for example, includes software executing within an emulation environment provided by a computing system. The emulation software emulates an instruction processor having an interface to receive inter-processor messages. During emulation the emulated instruction processor calculates an actual count of the inter-processor messages received during emulation. A compiler executing on the computing system compiles test software to output an instruction stream for execution by the emulated instruction processor. The compiler calculates an expected count of inter-processor messages that the emulated instruction processor is expected to receive during emulation. Emulation control software executing on the computing system generates a report that presents the expected count of the inter-processor messages and the actual count of the inter-processor messages.

25 Claims, 4 Drawing Sheets

INSTRUCTION PROCESSOR EMULATION HAVING INTER-PROCESSOR MESSAGING ACCOUNTING

TECHNICAL FIELD

The invention relates to computer systems and, more particularly, to emulation techniques to aid in the design and testing of computer systems.

BACKGROUND

A computer system typically involves multiple components working in cooperation to perform a task. For example, a computer system may include one or more co-operating instruction processors. The instruction processors may be supported by components such as communication busses, cache memories, shared and dedicated memories, input/output (I/O) devices, interface hardware, and the like.

The process of designing and ensuring proper functionality of these constituent components, i.e., the development process, is often involved and time consuming. In addition, the demand for computer systems of increasing complexity, such as computer systems that incorporate an increasing number of co-operating instruction processors, further increases the time and resources required to design and ensure the proper functionality of components.

In order to expedite the design process, emulation tools are often used to assist in testing the functionality of a component or system being designed. During this process, one or more emulation modules are often developed to interface with and test the functionality of the components being designed. For example, a designer currently developing a memory architecture may use an emulation module to mimic the functionality of an associated instruction processor. The emulated instruction processor may be used, for example, to interact with the memory architecture being developed in a manner that conforms to that of an actual instruction processor in order to test the operation of the memory architecture. As the processor itself may also not yet be fully implemented, the use of an emulated instruction processor allows the development of the actual instruction processor and the memory architecture to proceed concurrently. In this manner, the development period needed to complete the overall computer system may be compressed.

A designer may develop an emulation module for a particular component by utilizing an editor or other software application to describe the functionality of the component in accordance with a hardware description language (HDL). Examples of widely-used HDLs include the Very high-speed integrated circuits Hardware Description Language (VHDL) and Verilog™, which is described in the IEEE Verilog 1364-2000 standard. These languages support syntaxes that appear similar to software programming languages, such as C++ and Java, and allow the designer to define and simulate components using high-level code by describing the structure and behavior of components.

While the use of emulation can greatly aid in the development of the computer system, emulation modules may require extended functionality and resources to properly aid the design of computer systems of increasing complexity. For example, an emulated instruction processor may require extended functionality and resources to account for the growing complexity associated with the incorporation of multiple co-operating instruction processors.

As one example, extended functionality and resources may be required to accurately emulate inter-processor messaging. In a multi-processor computing system, the instruction processors may be coupled via a dedicated communication bus. The co-operating instruction processors exchange inter-processor messages to assist in the execution of computing tasks. More specifically, the instruction processors may exchange messages to properly synchronize parallel execution of instruction streams to more efficiently complete a common task, ensure cache coherency, offload tasks between processors, control access to shared resources, and the like. Different types of inter-processor messages, such as directed and broadcast message types, may be used. More particularly, a source instruction processor may send a direct message to a specific destination instruction processor via a common communication bus. In contrast, the source instruction processor may send a broadcast message to multiple instruction processors connected to the common communication bus. Improper inter-processor messaging may compromise the efficient nature of co-operating processors, or even cause computing errors or system failures. Thus, techniques for accurately emulating inter-processor messaging functions may aid in the design and development of multi-processor computing systems.

SUMMARY

In general, techniques are described for emulating inter-processor communications between multiple instruction processors. Specifically, the techniques describe an emulated environment that provides inter-processor message accounting and error detection. The described techniques may be utilized to provide detailed information relating to inter-processor messaging within the emulation environment.

The techniques provide compile-time information that specifies a number of inter-processor messages that each instruction processor of the emulation environment is expected to receive during emulation. Specifically, a compiler compiles emulation software into a set of instruction streams to be executed by the instruction processors, and provides information specifying the number of inter-processor messages that each instruction processor should receive upon execution of the emulation software. The compiler may generate the compile-time information to categorize the number of expected messages by message type, e.g., directed and broadcast. The compile-time information may describe other characteristics of the expected messages, such as the source instruction processor for each message, the destination instruction processor for each message, the length of the expected message, the order of the messages, and the like. In one embodiment, the compiler inserts write instructions within instruction streams, causing the instruction processor to write the compile-time information to specific memory locations within a memory architecture of the emulation environment. In this manner, the compiler may make the compile-time information readily available for error detection during or after execution of the emulation software.

While executing the emulation software, the instruction processors collect run-time information regarding the actual inter-processor messages received for each message type. Additional run-time information may be collected regarding other characteristics of the actual inter-processor messages received, such as the source instruction processor for each message, the length of the each message received, total bytes received, the order of the messages, and the like. The instruction processors write the run-time information to the memory architecture for subsequent analysis. For example, once the emulation software has been executed and emulation is complete, scripts or other emulation control software may be used to analyze the contents of the memory architecture. In particular, the analysis software analyzes the compile-time information and the run-time information to determine whether any messaging errors occurred. Moreover, the emulation control software may aid the identification of the source of the error and the type of message for which the error occurs.

In one embodiment, a method comprises compiling test software to output instruction streams for execution by a set of emulated instruction processors operating within an emulation environment, and analyzing the instruction streams during compilation to calculate expected counts of inter-processor messages that the emulated instruction processors are expected to receive. The method further comprises calculating actual counts of inter-processor messages received by the emulated instruction processors during execution of the instruction streams by the emulated instruction processors, and generating a report that presents the expected counts of inter-processor messages calculated during compilation and the actual counts of inter-processor messages received during emulation.

In another embodiment, a system comprises software executing within an emulation environment provided by a computing system, wherein the emulation software emulates an instruction processor having an interface to receive inter-processor messages, and further wherein during emulation the emulated instruction processor calculates an actual count of the inter-processor messages received during emulation. The system further comprises a compiler executing on the computing system to compile test software to output an instruction stream for execution by the emulated instruction processor, wherein the compiler calculates an expected count of inter-processor messages that the emulated instruction processor is expected to receive during emulation, and emulation control software executing on the computing system to generate a report that presents the expected count of the inter-processor messages and the actual count of the inter-processor messages.

In another embodiment, a system comprises emulation means for emulating a plurality of instruction processors to produce run-time information that specifies characteristics of inter-processor messages received by the instruction processors when executing test software. The system further comprises compilation means for compiling the test software to produce compile-time information that specifies characteristics of inter-processor messages expected to be received by the instruction processors during execution of the test software; and reporting means for generating a report that presents the run-time information and the compile time information.

The invention may provide one or more advantages. In general, the techniques may be utilized to implement an emulation environment that provides inter-processor message accounting and error detection. By making use of the techniques described herein and the extended inter-processor messaging information provided by the emulation control software, a designer may more quickly identify and resolve inter-processor messaging errors within a multi-processor computer system under development. As a result, development of components associated with inter-processor messaging, such as the instruction processors and the communication bus, may require reduced time, resources, or both.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
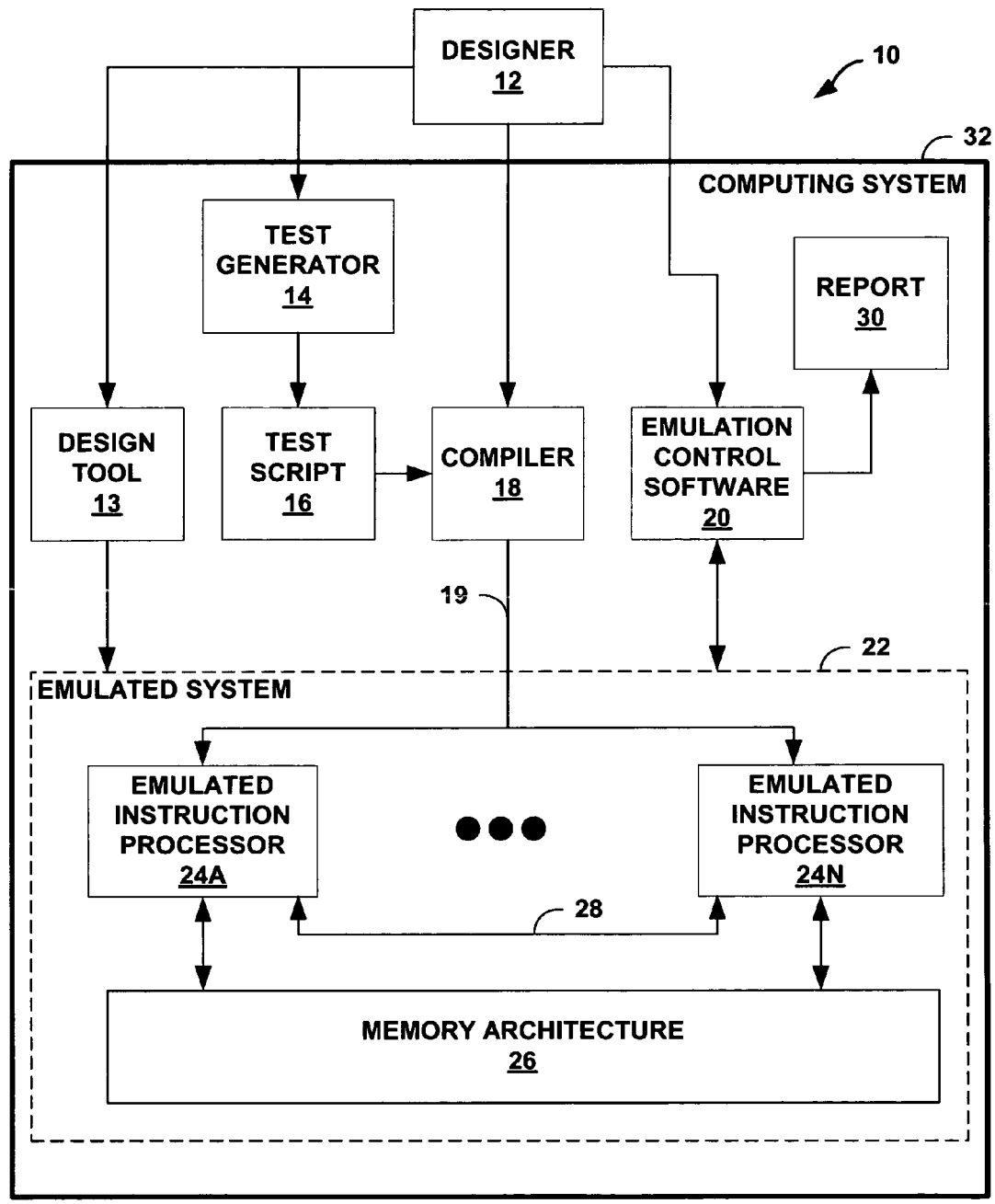
FIG. 1 is a block diagram illustrating an example emulation environment.

FIG. 1 is a block diagram illustrating an example emulation environment 10 in which a designer 12 makes use of computer-aided techniques to aid in the design, simulation and verification of components associated with a computer system. In particular, designer 12 interacts with design tool 13 to develop the constituent components of emulated system 22. In the exemplary embodiment of FIG. 1, emulated system 22 includes one or more emulated instruction processors 24A–24N ("emulated instruction processors 24") that emulate the functionality of instruction processors to aid in the design and testing of inter-processor message bus 28 and memory architecture 26, which may comprise a hierarchy of caches and memory units. Emulated system 22 may comprise additional components, such as peripheral devices, input/output interfaces, input/output processors, and the like. However, for ease of illustration, these other components are not shown in FIG. 1.

Design tool 13 may comprise a circuit design tool with which designer 12 interacts to develop graphical representations of the components of emulated system 22 in the form of one or more schematic diagrams. Designer 12 invokes design tool 13 to graphically layout the component instances of emulated system 22 and define signals to interconnect the instances. Alternatively, design tool 13 may comprise an editor or other software application with which designer 12 interacts to describe emulated system 22 in accordance with a hardware description language (HDL). An example of a circuit design tool is Concept® HDL from Cadence Design Systems, Inc. of San Jose, Calif. Examples of widely used HDLs include the Very high speed integrated circuits Hardware Description Language (VHDL) and Verilog™.

Designer 12 utilizes test script 16 to test the functionality of the components within emulated system 22, such as memory architecture 26 and message bus 28. In particular, designer 12 configures test generator 14 to generate test script 16, which defines software programs for execution by emulated instruction processors 24. Compiler 18 compiles test script 16 to generate one or more instruction streams 19 in the form of machine executable instructions for execution by emulated instruction processors 24. During this process, as further described herein, compiler 18 generates "compile-time" information that specifies a number of inter-processor messages that each of emulated instruction processors 24 is expected to receive when executing the respective one of instruction streams 19. Compiler 18 may generate the compile-time information for each emulated instruction processors 24 in a form that lists the number of messages expected for each message type, e.g., directed messages and broadcast message. In addition, compiler 18 may analyze test scripts 16 and generate the compile-time information to describe other characteristics of the expected messages, such as the source emulated instruction processor 24 for each message, the length of each expected message, the total bytes expected, the order of the messages, and the like.

In one embodiment, compiler 18 inserts write instructions within instruction streams 19, causing emulated instruction processors 24 to write the compile-time information to specific memory locations within memory architecture 26. In this manner, compiler 18 may make the compile-time information readily available for error detection during or after execution of instruction streams 19. Upon completion of compilation, compiler 18 outputs instruction streams 19 to emulated instruction processors 24. In one embodiment, each of instruction streams 19 is loaded into one or more internal memories (not shown) within a respective one of emulated instruction processors 24.

Once loaded, emulated instruction processors 24 execute the instructions contained within instruction streams 19 and mimic the operation of fully-designed instruction processors to test the constituent components of a computer system. In particular, emulated instruction processors 24 mimic instruction processors that exchange inter-processor messages via message bus 28. As described, emulated instruction processors 24 include functionality to collecting "run-time" information that describes the inter-processor messages actually received by each of the emulated instruction processors from message bus 28 during execution of instruction streams 19. For example, each emulated instruction processor 24 may count the number of messages for each message type, e.g., direct or broadcast. Emulated instruction processors 24 may collect additional run-time information regarding other characteristics of the actual inter-processor messages received, such as the source instruction processor for each message, the length of the each message received, total bytes received, the order of the messages, and the like.

In one embodiment, as described in further detail below, emulated instruction processors 24 may include a set of registers (not shown in FIG. 1) to store inter-processor message counts. Upon receiving an inter-processor message, the receiving one of emulated instruction processors 24 updates the inter-processor message counts based on the message type. In this manner, emulated instruction processors 24 include functionality to provide inter-processor messages accounting and error detection.

Once emulation is complete, designer 12 may invoke emulation control software 20 to analyze the state of emulated system 22 and generate inter-processor messaging report ("report") 30. In particular, emulation control software 20 analyzes the compile-time information provided by compiler 18 and the run-time information provided by emulated instruction processors 24, and generates report 30 to flag any potential discrepancies between the information. In particular, emulation control software 20 may compare the expected inter-processor message counts stored in memory architecture 26 to the actual inter-processor messages counts stored in the registers (not shown) to determine inter-processor messaging errors. Report 30 may further indicate successful results, the nature of the comparison, actual results, expected results and the like. Report 30 may, for example, identify errors, such as inter-processor messaging errors, or unexpected results from the execution of test script 16 in an attempt to aid designer 12 in locating and resolving design errors within emulated system 22 and, in particular, the non-emulated components, e.g., memory architecture 26 or message bus 28. In this manner, the emulation techniques described herein may aid identification and resolution of inter-processor messaging errors within a multi-processor computer system under development. As a result, development of components associated with inter-processor messaging, such as actual (non-emulated) instruction processors, memory architecture 26, message bus 28, and the like may require reduced time, resources, or both.

Computing system 32 provides a platform for execution of emulation programs and utilities, such as, design tool 13, test generator 14, compiler 18 and emulation control software 20. Computing system 32 may comprise one or more computers, each having a processor, working in co-operation to form emulation environment 10. In particular, each computer included within computing system 32 may execute one or more of the above programs. For example, one computer may execute test generator 14 to generate test script 16. Another computer may execute compiler 18 to compile test script 16. Yet another computer may execute design tool 13, emulated system 22 and emulation control software 20, wherein emulated system 22 executes instruction streams 19 and emulation control software 20 analyzes results of executing instruction streams 19 to generate report 30. The computers may communicate information, such as test script 16 and instruction streams 19, via a local area network or any other means of communication.

Figure 2:
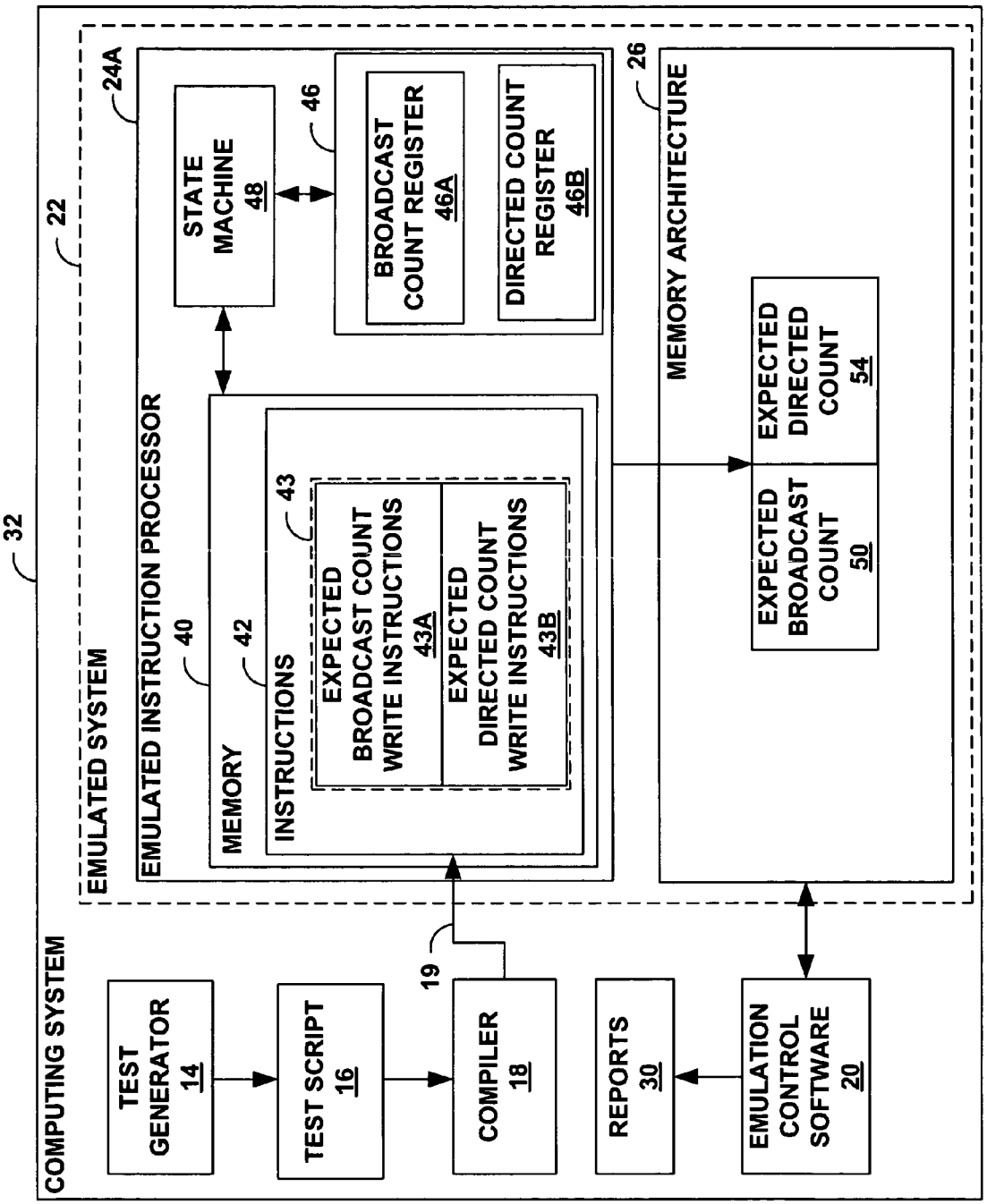
FIG. 2 is a block diagram illustrating a computing system that provides an operating environment for the emulation environment of FIG. 1.

FIG. 2 is a block diagram illustrating an exemplary embodiment of computing system 32 of FIG. 1 in more detail. As described above, emulated system 22 emulates a computer system, and in particular a multiprocessor computer system. For ease of illustration, emulated instruction processor 24A is depicted in further detail, although any of emulated instruction processors 24 may incorporate the illustrated features.

Emulated instruction processor 24A, as shown in FIG. 2, includes internal memory 40, state machine 48, and inter-processor message count registers ("registers") 46. Memory 40 provides a storage medium for instruction streams 19 in the form of executable instructions 42, which includes write instructions 43 inserted by compiler 18 in the manner described above. Write instructions 43 includes specific write instructions for the various types of messages, e.g., expected broadcast count write instructions 43A and expected directed count write instruction 43B. State machine 48 accesses memory 40 to retrieve and execute instructions 42.

Registers 46 provide a storage medium for storing run-time inter-processor message information collected by state machine 48 during the execution of instructions 42. Specifically, state machine 48 updates broadcast count register 46A and directed count register 46B, respectively, to count inter-processor messages received during emulation. State machine 48 increases the respective message count during execution of instructions 42 when emulated instruction processor 24A receives an inter-processor message of the associated type. In particular, upon receiving an inter-processor message, state machine 48 temporarily suspends execution and processes the incoming message to determine the type of message received. Depending on the inter-processor message type, state machine 48 increments either broadcast count register 46A or directed count register 46B, thereby providing a detailed accounting of the inter-processor messaging activity experienced by emulated instruction processor 24A during emulation. State machine 48 may process incoming messages to collect additional run-time information regarding other characteristics of the received inter-processor messages, such as the source instruction processor, the total bytes communicated by the message, the order of the message with respect to other received messages, and the like.

State machine 48 may determine the message type of the received message, since signals associated with broadcast and directed messages are separate and distinct. Thus, state machine 48 distinguishes between these messages based on the signal associated with the received message. In particular, among every one of these separate and distinct signals are signals that indicate the source of the message. State machine 48 can analyze these source signals and determine whether the received message is a direct message or a broadcast message. In the case where the source signal indicates a direct message, state machine 48 increments the current count stored within directed count register 46B. However, in instances where the source signal indicates a broadcast message, state machine 48 increments the current count stored within broadcast count register 46A. In like manner, emulated instruction processors 24B–24N may also include memories, state machines, and inter-processor message count registers similar to those shown within emulated instruction processor 24A.

During compilation of test script 16, compiler 18 determines the number of messages for each message type that emulated instruction processor 24A should receive during emulation. Compiler 18 encodes the expected message counts in write instructions 43, and inserts write instructions 43 into instruction streams 19, causing emulated instruction processor 24A to write the compile-time information to specific memory locations within memory architecture 26. The run-time information is not written into the memory. It is stored in the registers, which are accessed by emulation control software 20 after the simulation is over. These registers maintain their final states, which hold the total message counts determined during the run time.

In particular, state machine 48 executes write instructions 43A, 43B, and writes the expected broadcast and directed message counts, as calculated by compiler 18, to memory locations 50, 54 of memory architecture, respectively. In this manner, the compile-time information that describes the number of expected messages per message type is available in memory architecture 26 for post-emulation analysis by emulation control software 20.

Compiler 18 typically inserts the write instruction so that upon generation of instruction streams 19, each of emulated instruction processors 24 receive one of instruction streams 19 having write instructions 43 near the end of the instruction stream. In like manner, other emulated instruction processors 24 may write compile-time information to memory architecture 26 describing the expected message counts for each message type, e.g., broadcast and directed. These writes may organize the counts in memory architecture 26 such that emulation control software 20 may easily analyze the results. For example, the following table illustrates an example organization of the compile-time and run-time information written to memory architecture 26.

TABLE 1

| Emulated Processor | Expected Broadcast Messages | Expected Directed Messages |
|---|---|---|
| 1 | 10 | 7 |
| 2 | 23 | 14 |
| 3 | 8 | 4 |
| . | . | . |
| . | . | . |
| . | . | . |
| M | 15 | 11 |

As shown by Table 1, state machine 28 may write the data to memory architecture 26 in a form that lists each of emulated instruction processors 24, followed by expected messages counts for each message type. Once execution of instruction streams 19 is complete, emulation control software 20 may analyze the contents of memory architecture 26 and count registers 46 to identify any messaging errors. For example, in the above example, a directed count register of emulated processor 1 may store a count of 5. Thus, emulated processor 1 received two less directed messages during emulation than the number of directed messages that were expected.

Emulation control software 20 may analyze the contents of memory architecture 26 and registers 46 to identify any errors or discrepancies, and generate report 30. Emulation control software 20 may identify errors, for example, by comparing the expected message counts stored in memory architecture 26 and actual message counts stored in count registers 46 for each of emulated instruction processors 24 for each message type.

As illustrated, the emulation techniques provide inter-processor message accounting and error detection. The above process may easily be automated allowing designer 12 to execute test scripts and have report 30 automatically generated. Designer 12, with aid from report 30, may utilize the emulation techniques to resolve messaging errors and aid in the development of a multiprocessor computer system.

Figure 3:
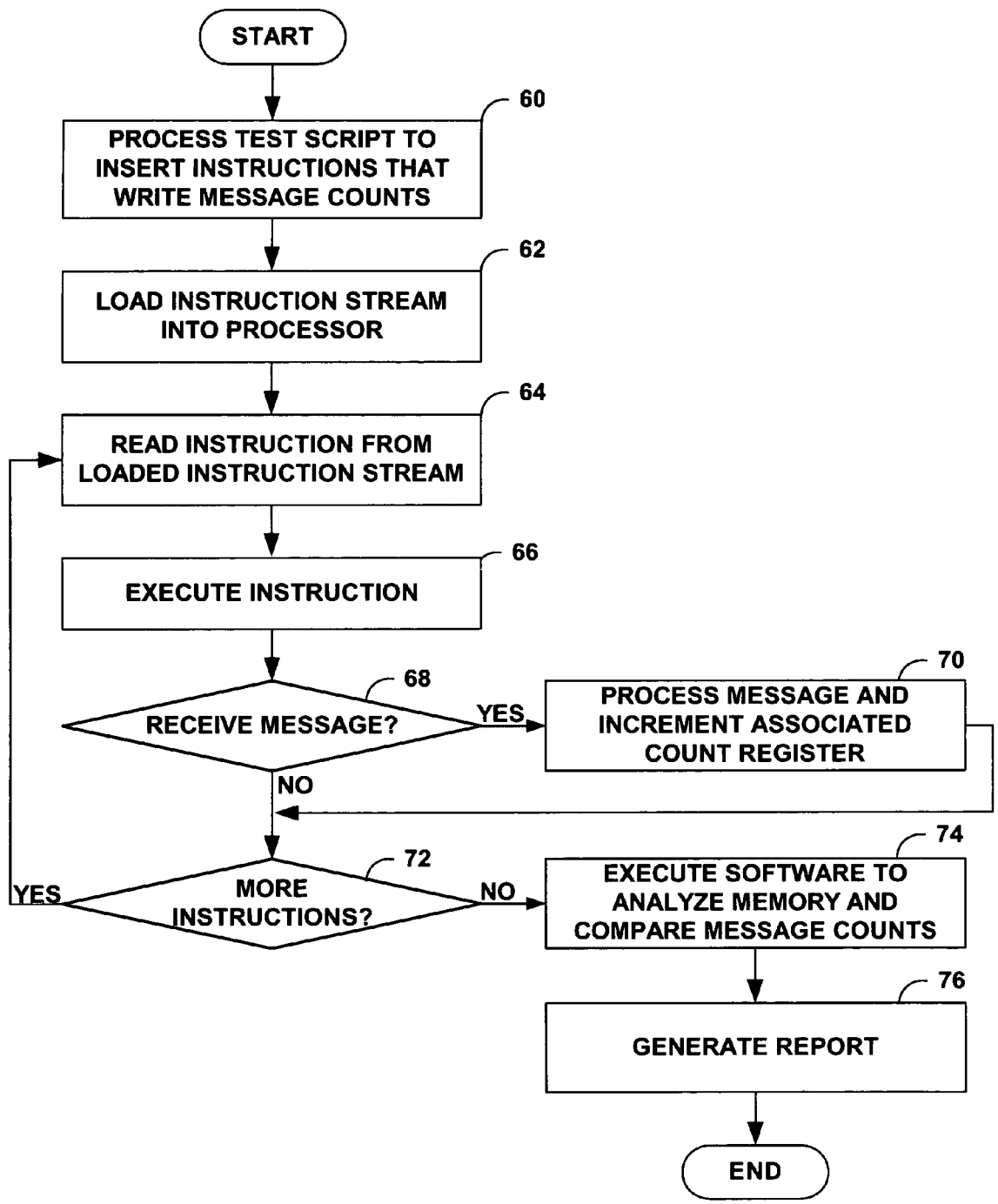
FIG. 3 is a flowchart further illustrating techniques for emulating inter-processor messaging functionality and providing message accounting and error detection.

FIG. 3 is a flowchart further illustrating the inter-processor message accounting and error detection emulation techniques. In general, the flowchart illustrates operation of computing system 32 (FIG. 2). Initially, compiler 18 processes test script 16 to generate machine executable instructions and automatically injects write instructions 43 into instruction streams 19 (60). Specifically, compiler 18 identifies messaging instructions within instruction streams 19 that direct emulated instruction processors 24 to issue inter-processor messages. For each instruction, compiler 18 identifies the destination as one of emulated instruction processors 24, and determines the inter-processor message type of each of the inter-processor messages. Based on the identified messaging instructions, compiler 18 calculates a respective expected count for each of the inter-processor message types, e.g., directed and broadcast. Compiler 18 adds write instructions 43 that, when executed, cause instruction processors 24 to write to memory architecture 26 the expected number of broadcast and directed messages, i.e., compile-time information, that each of processors 24 should receive during the course of executing instruction streams 19.

After inserting the write instructions, compiler 18 loads respective instruction streams 19 into emulated instruction processors 24, e.g., as instructions 42 loaded into memory 40 of emulated instruction processor 24A (62). Designer 12 may then initiate emulated system 22 to begin execution of the loaded instructions. For purposes of illustration, the flowchart of FIG. 3 will be explained in reference to instruction processor 24A.

Once loaded, emulated instruction processor 24A begin to execute the loaded instruction streams, i.e., instructions 42 stored in memory 40. In particular, internal state machine 48 reads instructions 42 (64), determines the type of instruction by, for example, examining an operational code within the instruction, and executes the instruction (66).

During the course of executing these instructions, emulated processor 24A may receive an inbound inter-processor message from another one of emulated instruction processors 24 (68). Emulated processor 24A may, for example, receive a broadcast or a directed inter-processor message sent to a group of processors or a single processor, respectively. Once emulated processor 24A receives the message, state machine 48 invokes instructions to process the received message. During this process, state machine 48 increments either broadcast count register 46A or directed count register 46B depending on the type of the message (68).

Once the message has been processed, or in the event a message was not received, emulated processor 24A continues to execute the stored instructions 42 in similar fashion (72). During the course of executing instructions 42, state machine 48 encounters write instructions 43 injected by compiler 18. Write instructions 43 specify particular addresses in memory architecture 26 to which the expected message counts are written. Moreover, write instructions 43 may direct state machine 48 to store the compile-time information in an organized manner similar to that of Table 1 (shown above).

After executing the current instruction, state machine 48 accesses memory 40 to determine whether there are more of instructions 42 to execute (72). If state machine 48 determines that there are more of instructions 42 to execute, state machine 48 accesses memory 40 again to read the next instruction included within the loaded instruction stream, e.g., instructions 42. However, state machine 48 may determine that there are not any more of instructions 42 to execute. In this instance, emulated system 22 has finished executing the test and designer 12 may execute software, such as emulation control software 20, to analyze the contents of memory architecture 26 and count registers 46A and 46B as updated by emulated instruction processors 24 (74).

Emulation control software 20 processes the contents of memory architecture 26 and emulated processor count registers 46A and 46B and generates report 30 that details the run-time and compile time inter-processor messaging data stored within the memory architecture (74) and the count registers. In addition, emulation control software 20 may analyze the data to identify any potential inter-processor messaging errors. Upon finding an error, emulation control software 20 may flag the error and generate report 30 (76), so that designer 12 may resolve the error. In particular, emulation control software 20 may identify messaging errors by comparing expected counts, such as expected broadcast count 50 and expected directed count 54 to actual counts, such as actual broadcast count register 46A and actual directed count register 46B, respectively.

Figure 4:
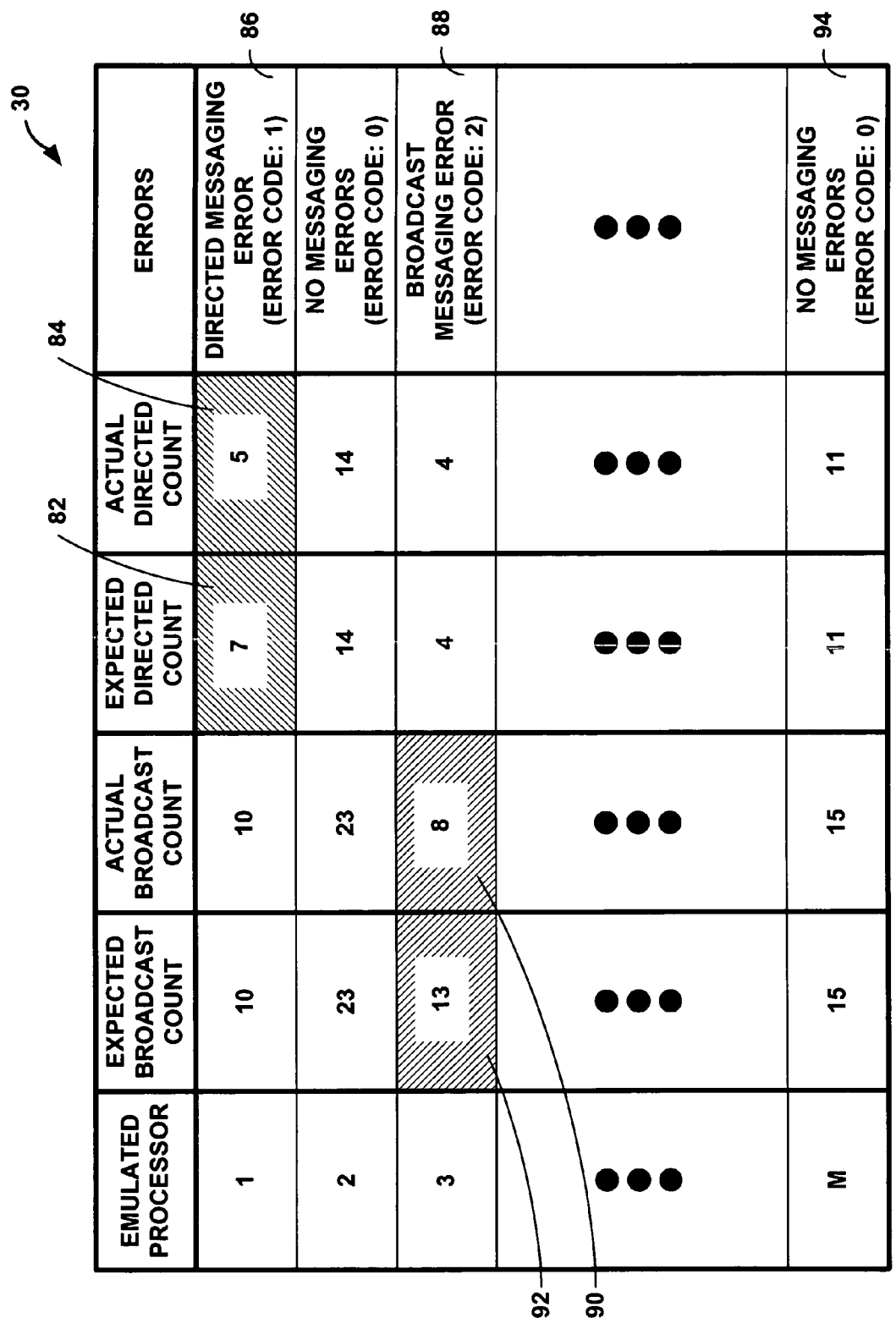
FIG. 4 is an example embodiment of an output screen presenting an exemplary processor messaging report.

FIG. 4 is an example embodiment of an output screen presenting an exemplary inter-processor messaging report 30 (FIG. 1) produced by emulation control software 20 (FIG. 2). Emulation control software 20 may access the contents of memory architecture 26 and count registers 46A and 46B to generate report 30, which may include processor messaging report 30. Designer 12 may analyze processor messaging report 30 and utilize the report as an aid to resolving inter-processor messaging errors within a computer system under development.

In the illustrated embodiment, processor messaging report 30 is similar in structure to Table 1 illustrated above. In a similar fashion as Table 1, report 30, as shown, has a header row that include column labels: EMULATED PROCESSOR, EXPECTED BROADCAST COUNT, ACTUAL BROADCAST COUNT, EXPECTED DIRECTED COUNT, ACTUAL DIRECTED COUNT, and ERRORS. Each row after the header row lists values associated with a respective one of emulated instruction processor 24. Each of emulated instruction processor 24 may receive an identification number, and report 30 aggregates run-time and compile time inter-processor messaging information for the plurality of emulated instruction processors within emulated system 22. Emulation control software 20 generates the ERRORS column to lists any identified errors or discrepancies associated with inter-processor messaging.

Emulation control software 20 may analyze the counts written by emulated instruction processors 24 to memory architecture 26, e.g., counts 50, 54, and the emulated processors count registers 46A and 46B and generate report 30 to display the counts as shown in FIG. 4. For example, report 30 indicates that when generating instruction streams 19, compiler 18 determined that emulated processor 1 was expected to receive ten broadcast messages, and that during emulation the emulated processor did indeed receive ten broadcast. However, compiler 18 determined that emulated processor 1 was expected to receive seven directed messages, and during emulation the emulated processor only received five directed messages. Emulation control software 20 may list message counts associated with each emulated instruction processors 24, as shown in FIG. 4.

When generating report 30, emulation control software 20 may also highlight possible errors and generate error messages and/or error codes. For example, emulation control software may compare expected directed count 82 with actual directed count 84 and detect a discrepancy. Emulation control software 20 may highlight this error by generating report 30 to include an error message 86 which may optionally specify an error code. Furthermore, emulation control software 20 may further draw attention to the error by shading message counts 82, 84.

Other types of errors may also occur during emulation. Specifically, a broadcast messaging error may occur, as illustrated by error message 88 is an example of this type of error. Emulation control software 20 may identify this type of error by comparing actual broadcast count 90 to expected broadcast count 92 to determine that a discrepancy exists between the compile-time information and the run-time information. In some instances, an emulated processor may not incur any messaging errors, i.e., the expected number of messages as determined at compile-time equals the number of actual messages received during emulation at run-time. Emulation control software 20 indicates this status via message 94, which indicates that there are no messaging errors associated with the respective emulated instruction processor.

Designer 12 may utilize report 30 to determine whether proper messaging functionality occurred during emulation, and to aid in the identification and resolution of errors within the constituent components of a computer system being designed. Various embodiments of the invention have been described. These and other embodiments are within the scope of the following claims.

The invention claimed is:

1. A processor-based method for emulating inter-processor messaging comprising:
    compiling test software to output instruction streams for execution by a set of emulated instruction processors operating within an emulation environment;
    analyzing the instruction streams during compilation to calculate expected counts of inter-processor messages that the set of emulated instruction processors are expected to receive;
    calculating actual counts of inter-processor messages received by the set of emulated instruction processors during execution of the instruction streams by the set of emulated instruction processors; and
    generating a report that presents the expected counts of inter-processor messages calculated during compilation and the actual counts of inter-processor messages received during emulation.

2. The method of claim 1, further comprising inserting one or more write instructions into the instruction streams during compilation to direct each of the set of emulated instruction processors to write the respective expected count of inter-processor messages to a memory architecture upon execution of the instruction streams.

3. The method of claim 1, wherein analyzing the instruction stream during compilation comprises:
    identifying inter-processor messaging instructions within the instruction streams;
    identifying the emulated instruction processors specified as destinations by the messaging instructions; and
    calculating the respective expected counts for the set of emulated instruction processors based on the destinations specified by the messaging instructions.

4. The method of claim 1, further comprising:
    wherein analyzing the instruction streams further comprises analyzing the instruction streams during compilation to calculate an expected count of inter-processor messages for each of a plurality of inter-processor message types supported by the set of emulated instruction processors,
    wherein calculating actual counts further comprises calculating an actual count of inter-processor messages received by each of the set of emulated instruction processors for each of the plurality of inter-processor message types, and
    wherein presenting a report further comprises presenting a report that displays the expected count and the actual count for each of the inter-processor message types.

5. The method of claim 4, wherein analyzing the instruction stream comprises:
    identifying messaging instructions within the instruction streams for sending inter-processor messages;
    determining, for each of the inter-processor messages, a destination one of the set of emulated instruction processors and a message type; and
    calculating the respective expected counts based on the determined destinations and message types for the inter-processor messages.

6. The method of claim 4, wherein calculating actual counts comprises:
    receiving inter-processor messages with the set of emulated instruction processors during emulation;
    processing received inter-processor messages to determine message types for the inter-processor messages; and
    calculating the actual counts for each of the plurality of inter-processor message types based on the determined message types.

7. The method of claim 4, wherein the plurality of message types include a broadcast message type and a directed message type.

8. The method of claim 1, wherein calculating actual counts comprises accumulating the actual counts of inter-processor messages received within registers within the set of emulated instruction processors.

9. The method of claim 1, wherein generating a report:
    comparing the expected counts and the actual counts to identify any inter-processor messaging errors that occurred during emulation; and
    generating the report to indicate the identified inter-processor messaging errors.

10. The method of claim 9, wherein generating a report further comprises highlighting discrepancies between any of the expected counts and the actual counts.

11. The method of claim 9, which generating a report further comprises categorizing the expected counts and the actual counts based on a plurality of message types supported by the set of emulated instruction processors.

12. The method of claim 1, further comprising:
    modifying a non-emulated component in response to the report;
    re-executing the instructions streams with the set of emulated instruction processors; and
    generating a second report that presents the expected counts of inter-processor messages and actual counts of inter-processor messages received by the set of emulated instruction processors during the re-execution of the instruction streams.

13. A processor-based system for emulating inter-processor messaging comprising:
    a computing system responsive to external messaging selection and control;
    emulation software executing within an emulation environment provided by the computing system,
    wherein the emulation software emulates an instruction processor having an interface to receive inter-processor messages, and further wherein during emulation the emulated instruction processor calculates an actual count of the inter-processor messages received during emulation;
    a compiler executing on the computing system to compile test software to output an instruction stream for execution by the emulated instruction processor, wherein the compiler calculates an expected count of inter-processor messages that the emulated instruction processor is expected to receive during emulation; and
    emulation control software executing on the computing system to generate a report that presents the expected count of the inter-processor messages and the actual count of the inter-processor messages.

14. The system of claim 13, further comprising:
    software executing within the emulation environment to emulate a memory architecture coupled to the emulated instruction processor,
    wherein the compiler inserts one or more write instructions into the instruction stream during compilation to direct the emulated instruction processor to write the expected count to the emulated memory architecture upon execution of the instruction streams.

15. The system of claim 13, wherein the interface supports a plurality of inter-processor message types, and the compiler calculates expected counts for each of the plurality of inter-processor message types.

16. The system of claim 15, wherein the emulated instruction processor calculates actual counts for each of the plurality inter-processor message types.

17. The system of claim 16, wherein the emulation control software generates the report to display the expected count and the actual count for each of the plurality of inter-processor message types.

18. The system of claim 15, wherein the plurality of inter-processor message types includes a broadcast message type and a directed message type.

19. The system of claim 15, wherein the compiler:
identifies messaging instructions within the instruction stream;
determines one or more intended recipients of a message generated upon execution of the messaging instruction;
determines the inter-processor message type of each of the inter-processor messages; and
calculates a respective expected count for each of the inter-processor message types based on the determined inter-processor messages.

20. The system of claim 13, wherein the emulated instruction processor includes an inter-processor message count register and a state machine, wherein the state machine processes the inter-processor messages and accumulates the actual count of the inter-processor messages within the inter-processor message count register.

21. The system of claim 13, wherein the emulation control software compares the expected count and the actual count to identify any inter-processor messaging errors that occurred during emulation, and generates the report to indicate the identified inter-processor messaging errors.

22. The system of claim 21, wherein the emulation control software generates the report to highlight discrepancies between the expected count and the actual count.

23. A system for emulating inter-processor messages comprising:
emulating means for emulating a plurality of instruction processors to produce run-time information that specifies characteristics of inter-processor messages received by the instruction processors when executing test software;
compiling means for compiling the test software to produce compile-time information that specifies characteristics of inter-processor messages expected to be received by the instruction processors during execution of the test software; and
reporting means for generating a report that presents the run-time information and the compile time information.

24. The system of claim 23, wherein the compile-time information includes an expected count of the inter-processor messages that the emulated instruction processor is expected to receive during emulation, and the run-time information includes an actual count of the inter-processor messages received during emulation.

25. The system of claim 24, wherein the characteristics of the inter-processor messages include sources, total bytes, and order of the inter-processor messages.

* * * * *